(12) United States Patent
Dimpas

(10) Patent No.: US 11,082,615 B2
(45) Date of Patent: Aug. 3, 2021

(54) MOBILE TERMINAL DEVICE THAT GENERATES PICTURE WHERE PERSON'S EYE DIRECTION IN SHOT IMAGE HAS BEEN MODIFIED

(71) Applicant: KYOCERA Document Solutions Inc., Osaka (JP)

(72) Inventor: Philogene Kyle Dimpas, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/002,222

(22) Filed: Aug. 25, 2020

(65) Prior Publication Data

US 2021/0067692 A1 Mar. 4, 2021

(30) Foreign Application Priority Data

Sep. 3, 2019 (JP) .............................. JP2019-160594

(51) Int. Cl.
*H04N 5/232* (2006.01)
*H04N 5/225* (2006.01)
*G06K 9/00* (2006.01)
*H04N 5/76* (2006.01)

(52) U.S. Cl.
CPC ..... *H04N 5/23229* (2013.01); *G06K 9/00248* (2013.01); *G06K 9/00604* (2013.01); *G06K 9/00671* (2013.01); *H04N 5/2252* (2013.01); *H04N 5/2253* (2013.01); *H04N 5/232933* (2018.08); *H04N 5/76* (2013.01)

(58) Field of Classification Search
None
See application file for complete search history.

(56) References Cited

U.S. PATENT DOCUMENTS

| 2004/0001614 A1* | 1/2004 | Russon | G06K 9/00597 382/117 |
| 2015/0160837 A1* | 6/2015 | Kim | H04M 1/724 715/708 |
| 2015/0381889 A1* | 12/2015 | Toguchi | H04N 5/2258 348/207.11 |

FOREIGN PATENT DOCUMENTS

JP 2018-093303 A 6/2018

* cited by examiner

*Primary Examiner* — Eileen M Adams
(74) *Attorney, Agent, or Firm* — IP Business Solutions, LLC

(57) ABSTRACT

A mobile terminal device includes: a storage device that stores shot images taken by a camera; a face recognizer that recognizes a person's face image contained in a shot image selected from among the shot images stored in the storage device; a determiner that determines whether or not the person's face image recognized by the face recognizer is a camera-eye-aligned image where an eye direction of the person is aligned with the camera; an image modifier that modifies an image of an eye portion in the face image determined not to be a camera-eye-aligned image by the determiner to an image where the eye direction is aligned with the camera; and a controller that allows the storage device to store the shot image modified by the image modifier.

7 Claims, 13 Drawing Sheets

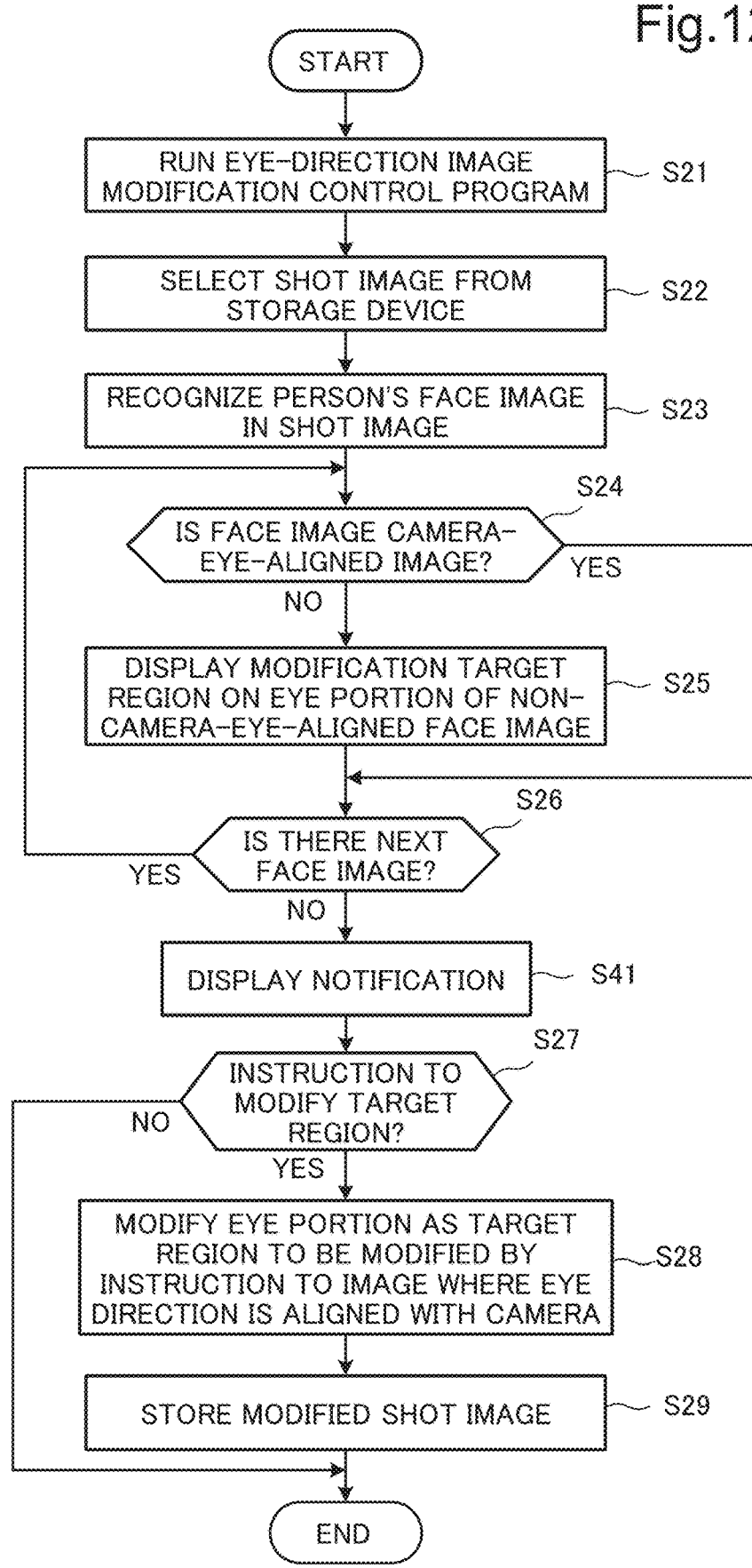

MOBILE TERMINAL DEVICE THAT GENERATES PICTURE WHERE PERSON'S EYE DIRECTION IN SHOT IMAGE HAS BEEN MODIFIED

INCORPORATION BY REFERENCE

This application claims priority to Japanese Patent Application No. 2019-160594 filed on Sep. 3, 2019, the entire contents of which are incorporated by reference herein.

BACKGROUND

The present disclosure relates to mobile terminal devices and particularly relates to a technique for generating a picture where a person's eye direction in a shot image has been modified.

For example, there are cases where a picture-taker takes themselves (a selfie) using a mobile terminal device (such as a smartphone or a tablet computer) with a camera. In doing so, in order to check how the picture-taker themselves as a subject is seen in a picture, they put their eyes, not to a camera lens, but to a display where a live view image is displayed. Then, the picture-taker presses a shutter button displayed on the display while viewing it. Therefore, the resultant shot picture is a camera-eye-misaligned picture in which the eyes of the picture-taker as a subject are not directed toward the camera lens and their eye direction is not aligned with the camera.

There is proposed, for example, a picture taking device configured to, upon receipt of an instruction to take a picture, gradually reduce the size of a live view image being captured in real time through a camera lens unit, concurrently gradually bring the display position of the live view image shrinking on the display closer to the lens unit, and then shoot a picture. Thus, even in the case where a picture-taker takes a selfie with other persons side by side in the same direction, a picture can be shot with the eye directions of all of the persons aligned with the camera at the right time for shooting.

SUMMARY

A technique improved over the aforementioned technique is proposed as one aspect of the present disclosure.

A mobile terminal device according to an aspect of the present disclosure includes a housing, a display device, a camera, an image storage device, and a control device. The display device is disposed on a particular one of a plurality of outside surfaces of the housing. The camera is disposed at a site of the particular surface of the housing other than the display device. The image storage device stores shot images taken by the camera. The control device includes a processor and functions, through the processor executing a control program, as a face recognizer, a determiner, an image modifier, and a controller. The face recognizer recognizes a person's face image contained in a shot image selected from among the shot images stored in the image storage device. The determiner determines whether or not the person's face image recognized by the face recognizer is a camera-eye-aligned image where an eye direction of the person is aligned with the camera. The image modifier modifies an image of an eye portion in the face image determined not to be a camera-eye-aligned image by the determiner to an image where the eye direction is aligned with the camera. The controller allows the image storage device to store the shot image modified by the image modifier.

BRIEF DESCRIPTION OF THE DRAWINGS

FIG. 12 is a flowchart showing an example of eye-direction image processing of a mobile terminal device according to a variation.

DETAILED DESCRIPTION

Hereinafter, a description will be given of mobile terminal devices according to embodiments of the present disclosure with reference to the drawings.

Figure 1:
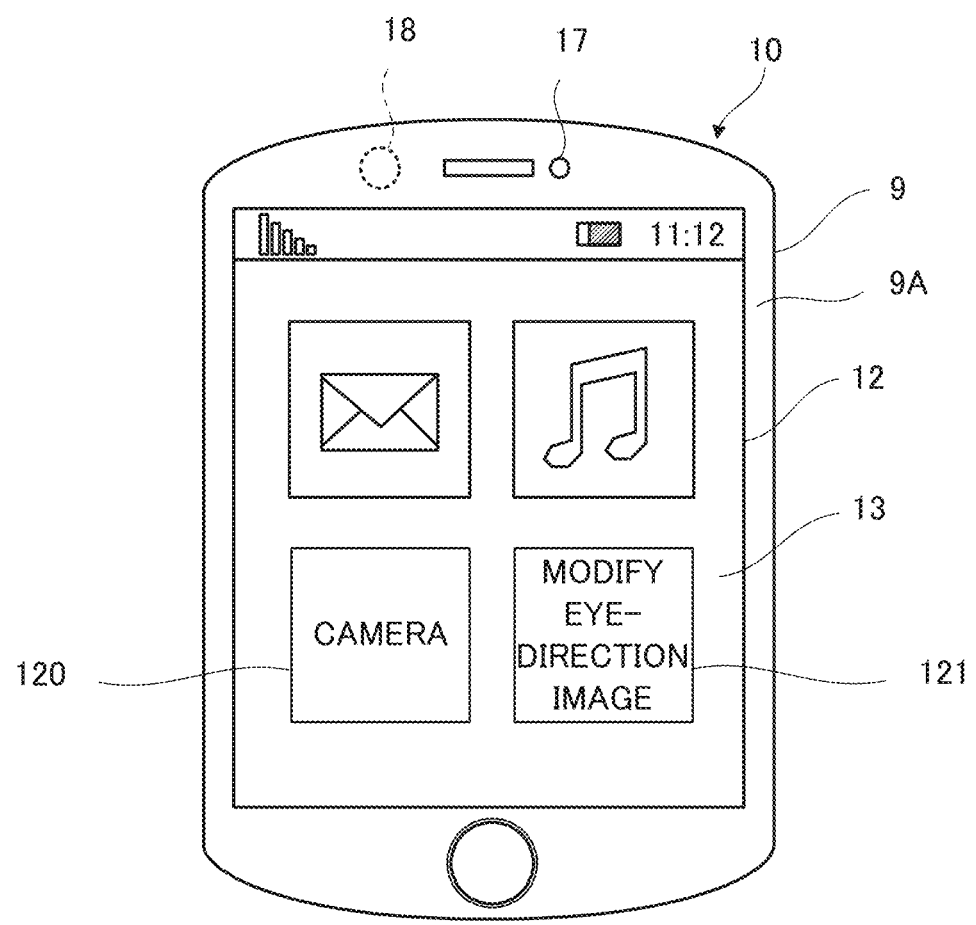
FIG. 1 is a front view of a mobile terminal device according to a first embodiment of the present disclosure.
Figure 2:
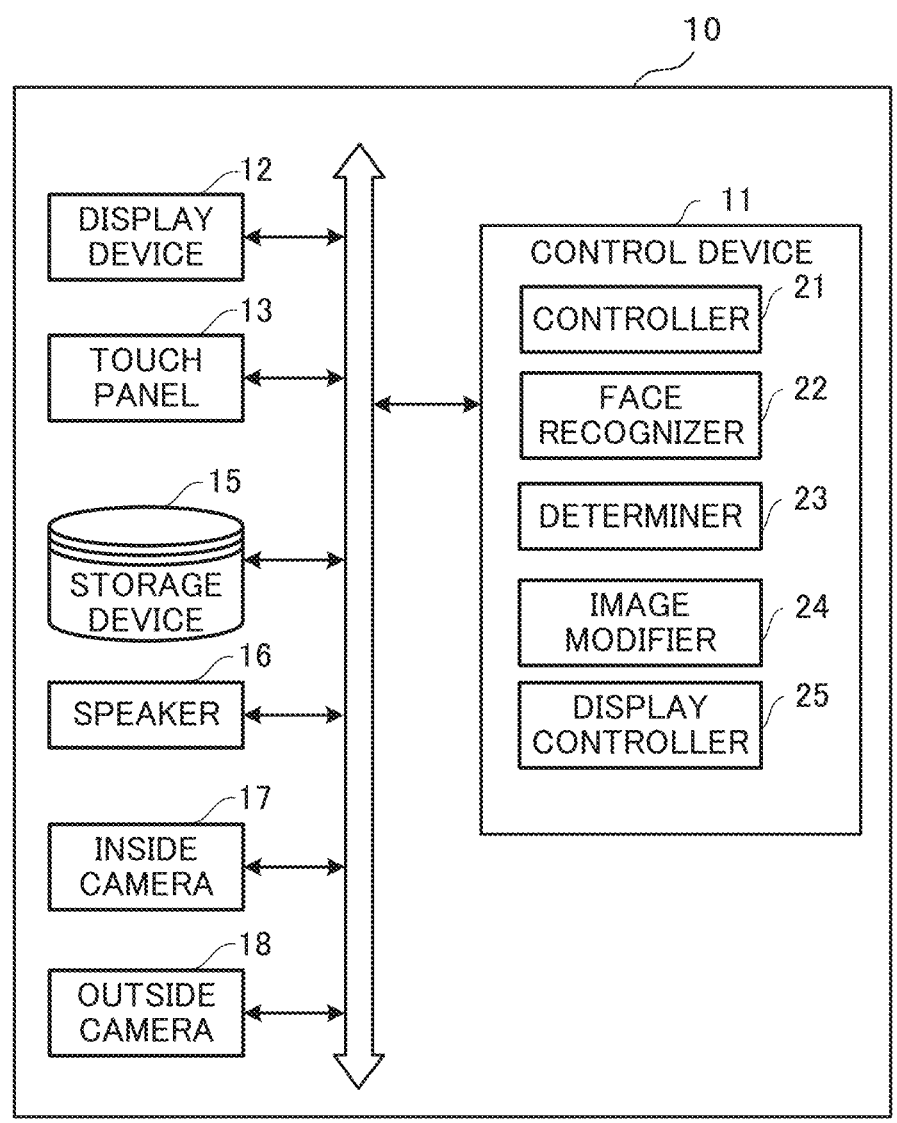
FIG. 2 is a block diagram showing an internal configuration of the mobile terminal device according to the first embodiment of the present disclosure.

FIG. 1 is a front view of a mobile terminal device according to a first embodiment of the present disclosure. FIG. 2 is a block diagram showing an internal configuration of the mobile terminal device according to the first embodiment of the present disclosure.

In a mobile terminal device 10 according to this embodiment, through the execution of an eye-direction image modification control program to be described hereinafter, a camera-eye-misaligned image modification function is established in which if a selfie image contains a person's face image having a camera-eye misalignment where the eye direction of the person is misaligned with the camera, the camera-eye-misaligned face image can be modified to a camera-eye-aligned image where the eye direction of the person is aligned with the camera.

The mobile terminal device 10 is a mobile terminal device, such as a tablet computer, and includes a housing 9, a control device 11, a display device 12, a touch panel 13, a storage device 15, a speaker 16, an inside camera 17, and an outside camera 18. These components are operable to transfer data or signals to and from each other via a bus.

The housing 9 has, for example, an approximately rectangular shape having four rounded corners in front view as shown in FIG. 1 and is a thin, box-shaped exterior container. The housing 9 has six outside surfaces, including a front surface 9A shown in FIG. 1, a back surface opposite to the front surface 9A, a left-side surface, a right-side surface, a top surface, and a bottom surface. As shown in FIG. 1, the display device 12 is disposed on the front surface 9A of the housing 9 and the inside camera 17 is disposed at a site of the front surface 9A other than the display device 12. The front surface 9A is an example of a particular surface defined in What is claimed is. The back surface of the housing 9 opposite to the front surface 9A is provided with the outside camera 18 as shown by the broken line in FIG. 1.

The display device 12 is a display device, such as a liquid crystal display (LCD) or an organic EL (organic light-emitting diode (OLED)) display.

The touch panel 13 is a touch panel of a resistive film system, a capacitance system or any other system. The touch panel 13 is disposed on the screen of the display device 12 and is capable of detecting a touch on the screen of the display device 12 with a finger or the like, together with the point of touch. Upon detection of a touch with a finger or the like, the touch panel 13 outputs a detection signal indicating the coordinate of the point of touch to a controller 21 of the control device 11 and so on. Therefore, the touch panel 13 serves as an operation device through which a user's operation made on the screen of the display device 12 is input.

The inside camera 17 is disposed on the front surface 9A where the display device 12 is disposed, and is, for example, a camera suitable for capture of a selfie image. For example, the controller 21 activates the inside camera 17 in accordance with a user's activation operation and allows the display device 12 to display a live view image being captured in real time through the inside camera 17. Thus, the user can take a selfie image while checking the live view image. The inside camera 17 is an example of a camera defined in What is claimed is.

The outside camera 18 is disposed on the back surface of the housing 9 and is, for example, a camera suitable for capture of a shot image not containing a picture-taker, i.e., or a non-selfie normal shot image. For example, the controller 21 activates the outside camera 18 in accordance with a user's activation operation and allows the display device 12 to display on its screen located on the front surface 9A of the housing 9 a live view image being captured in real time through the outside camera 18. Thus, the user can take a non-selfie normal shot image (i.e., a shot image not containing the picture-taker) while checking the live view image.

The storage device 15 is a large storage device, such as an SSD (solid state drive) or an HDD (hard disk drive), and stores various types of data and programs. Furthermore, the storage device 15 stores shot images taken by the inside camera 17 (i.e., selfie images) and shot images taken by the outside camera 18. The storage device 15 is an example of an image storage device defined in What is claimed is.

The speaker 16 outputs, under the control of the controller 21, various speeches, such as a response speech responding to a user's operation, a guidance speech giving operation guidance to the user, and a notification speech giving the user a notification.

The control device 11 is made up of a processor, a RAM (random access memory), a ROM (read only memory), and so on. The processor is a CPU (central processing unit), an MPU, an ASIC or the like. When a control program (for example, an eye-direction image modification control program) stored in the above ROM or the storage device 15 is executed by the above processor, the control device 11 functions as the controller 21, a face recognizer 22, a determiner 23, an image modifier 24, and a display controller 25. Alternatively, each of the above components of the control device 11 may not be implemented by the operation of the processor in accordance with the above control program, but may be constituted by a hardware circuit.

The controller 21 governs the overall operation control of the mobile terminal device 10. Furthermore, the controller 21 is connected to the display device 12, the touch panel 13, the storage device 15, the inside camera 17, the outside camera 18, and so on and performs the operation control of each of these components and signal or data transfer to and from each of the components. The display controller 25 controls, under the control of the controller 21, the display operation of the display device 12.

Furthermore, the controller 21 identifies, based on the detection signal output from the touch panel 13, a user's operation input from the user. An example of the user's operation is a touch gesture (tap gesture). Then, the controller 21 performs control corresponding to the identified user's operation. A description will be given below of, for example, the case where the user's operation is touch gestures on icons (graphic representations) 120, 121.

For example, when the user makes a touch gesture on the icon (graphic representation) 120 corresponding to a camera function displayed on the screen of the display device 12 shown in FIG. 1, a detection signal indicating the coordinate of the point of touch and representing the touch gesture is output to the controller 21 by the touch function of the touch panel 13 and the controller 21 then starts up, based on the detection signal, a camera shooting control program. When this camera shooting control program is run, the camera function is established.

Furthermore, when the user makes a touch gesture on the icon (graphic representation) 121 corresponding to a camera-eye-misaligned image modification function displayed on the screen of the display device 12 shown in FIG. 1, a detection signal indicating the coordinate of the point of touch and representing the touch gesture is output to the controller 21 by the touch function of the touch panel 13 and the controller 21 then starts up, based on the detection signal, an eye-direction image modification control program. When this eye-direction image modification control program is run, a camera-eye-misaligned image modification function is established in which if a selfie image contains a person's face image having a camera-eye misalignment, the camera-eye-misaligned face image can be modified to a camera-eye-aligned image.

The display controller 25 allows the display device 12 to display, on the screen shown in FIG. 6B to be described hereinafter, a shot image G1 selected according to a user's selecting operation on the touch panel 13 from among a thumbnail index of a plurality of shot images G1 to G4 displayed on the screen of the display device 12 shown in FIG. 6A to be described hereinafter.

The face recognizer 22 recognizes every person's face image contained in the shot image G1 selected from among the plurality of shot images G1 to G4 stored in the storage device 15. The face recognizer 22 recognizes every person's face image contained in the shot image G1 based on known face image recognition processing. Specifically, the face recognizer 22 detects every facial region in the shot image G1, normalizes the position and size of the facial region, and determines the positions of eyes, a nose, mouth ends, and so on as facial feature points. In doing so, if the shot image G1 contains a plurality of faces, a facial region is detected on a face-by-face basis and facial feature points are determined on a face-by-face basis.

The determiner 23 determines whether or not each person's face image recognized by the face recognizer 22 is a camera-eye-aligned image.

Figure 3A:
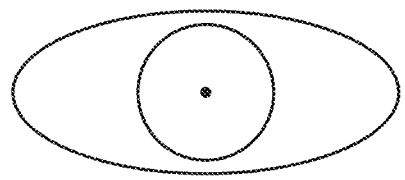
FIGS. 3A to 3C are views showing an example of iris centricity calculation by the mobile terminal device.
Figure 3B:
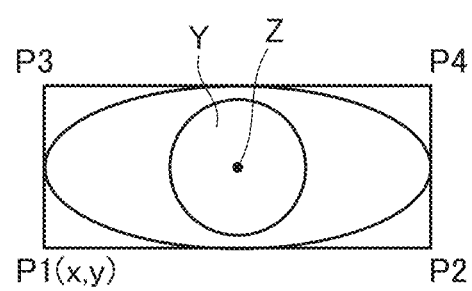
Figure 3C:
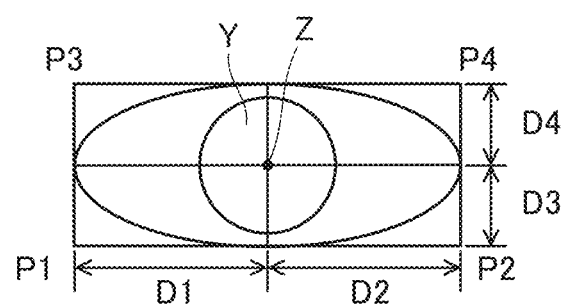

Specifically, the face recognizer 22 performs image recognition to extract image portions corresponding to eyes. Subsequently, the face recognizer 22 performs edge coordinate detection processing for determining coordinate data on some points of the extracted image portion corresponding to each eye. For example, if the extracted image portion corresponding to the eye is an image shown in FIG. 3A, the contour of the eye is surrounded by a rectangular frame as shown in FIG. 3B, a point P1 at the lower left corner of the frame is defined as a coordinate (x,y), and the coordinates of the other three corners P2, P3, and P4 are determined with reference to the coordinate of the point P1. Subsequently, the face recognizer 22 performs iris central coordinate detection processing for recognizing the iris Y by image recognition and determining the central coordinate Z of the iris Y. Then, the determiner 23 performs iris centricity calculation processing for calculating a deviation of the determined central coordinate Z of the iris Y from the center of the entire eye. As shown in FIG. 3C, this iris centricity calculation processing is performed by determining the distances D1 and D2 from the left and right sides of the frame to the iris center and the distances D3 and D4 from the top and bottom sides of the frame to the iris center and calculating D1/D2 (horizontal iris centricity) and D3/D4 (vertical iris centricity).

For example, when a subject's face is taken right in front, i.e., when the face is right opposite the inside camera 17 and the iris central coordinate Z is at the center of the eye, the subject looks at the camera, i.e., the subject is in a so-called camera-eye-aligned state. In this state, the distances D1 and D2 are approximately equal to each other, the distances D3 and D4 are also approximately equal to each other, and the results of both the above iris centricity calculations are a value "1" or its approximate value. For another example, when a subject's face is right opposite a camera, but the subject looks at a direction other than the camera, the center of the iris Y is deviated from the center of the entire eye. As the eye direction is farther away from the camera, the center of the iris Y is more deviated from the center of the entire eye. In such a case, as the eye direction is farther away from the camera, the results of the above iris centricity calculations indicate a larger difference from the value "1".

When the iris centricity calculation results as for the eyes in a person's face image recognized by the face recognizer 22 indicate the value "1" or its approximate value, the determiner 23 determines that the face image is a camera-eye-aligned image. When the iris centricity calculation results indicate neither the value "1" nor its approximate value, the determiner 23 determines that the face image is not a camera-eye-aligned image.

Figure 3D:
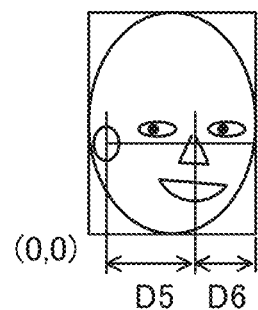
FIG. 3D is a view showing an example of facial frontality calculation by the mobile terminal device.

The above description has been given of the case where a person's face is right opposite the inside camera 17. The following description will be given of the case where a person's face is directed diagonally to the inside camera 17 with reference to FIG. 3D. The face recognizer 22 surrounds the contour of an extracted face image by a rectangular frame, defines the coordinate of the lower left corner as (0, 0), and determines the coordinates of the other three corners with reference to the coordinate of the lower left corner. Subsequently, the face recognizer 22 recognizes a nose image located at the center of the face, and detects the central coordinate of the nose image. FIG. 3D shows the distances D5 and D6 from the left and right sides of the detected face to the center of the nose, wherein the distances D5 and D6 vary with how much the face is directed diagonally. Specifically, if the face is directed slightly diagonally, the difference between the distances D5 and D6 is small. If the face is directed significantly diagonally, the difference between the distances D5 and D6 is large. When, as shown in FIG. 3D, the face is taken diagonally from the left and if the ratio between the distances D5 and D6 is, for example, "2:1", the calculation result of the facial frontality is "0.5". If, in this case, a camera-eye-aligned state where the subject looks at the camera is established, the irises are situated nearer the left sides of the eyes, the ratio between the distances D1 and D2 shown in FIG. 3C is about "1:2", and the calculation result of the horizontal iris centricity indicates approximately "0.5". When the horizontal iris centricity calculation results as for the eyes in a person's face image recognized by the face recognizer 22 indicate the value "0.5" or its approximate values, the determiner 23 determines that the face image is a camera-eye-aligned image. When the horizontal iris centricity calculation results indicate neither the value "0.5" nor its approximate value, the determiner 23 determines that the face image is not a camera-eye-aligned image.

If there are a plurality of persons' face images in a shot image recognized by the face recognizer 22, the determiner 23 determines, in a predetermined order, whether or not the individual face image is a camera-eye-aligned image. In this embodiment, the determiner 23 determines, in descending order of facial regions recognized by the face recognizer 22 (in the order of facial region from largest to smallest) as the predetermined order, whether or not the individual face image is a camera-eye-aligned image. The predetermined order may be, contrary to the above-described order, an ascending order of facial region (in the order of facial region from smallest to largest) or the order of arrangement in the shot image G1 (for example, order from right end to left end, order from left end to right end or order from top to bottom).

Alternatively, if there are a plurality of persons' face images in the shot image G1 recognized by the face recognizer 22, the determiner 23 may define the descending order of facial regions recognized by the face recognizer 22 as the predetermined order, may determine, only as for a predetermined number of (for example, "three") face images in the predetermined order, whether or not the individual face image is a camera-eye-aligned image, and may not determine, as for the remaining face images (for example, fourth to last face images) other than the predetermined number of face images, whether or not the individual face image is a camera-eye-aligned image. In some cases, it is sufficient if, of a plurality of face images, for example, three face images from one having the largest facial region to one having the third largest facial region are each determined to be or not to be a camera-eye-aligned image. In these cases, it can be avoided to determine, as for the face images having the fourth largest and smaller facial regions, whether or not the face image is a camera-eye-aligned image.

The display controller 25 allows, in the shot image G1 displayed on the display device 12, an eye portion of a face image determined not to be a camera-eye-aligned image by the determiner 23 to be displayed in a representation indicating that the eye portion is a modification target region to be modified. The display controller 25 may employ, as a representation indicating that an eye portion is a modification target region, a highlighting representation, such as a representation where a luminance difference is created by making the modification target region brighter and the other regions darker, a representation where a rectangular boundary line is drawn along the contour of the modification target region or a color-coded representation where the modification target region is different in display color from the other regions.

The image modifier 24 modifies the image of an eye portion in a face image determined not to be a camera-eye-aligned image by the determiner 23 to an image where the eye direction is aligned with the camera. For example, upon receipt of an instruction to modify the modification target region in the shot image G1 displayed on the display device 12, the image modifier 24 modifies the image of the eye portion, which is the modification target region, to an image where the eye direction is aligned with the camera. Without an instruction to modify the modification target region in the shot image G1 displayed on the display device 12, the image modifier 24 does not modify the image of the eye portion which is the modification target region.

Figure 3E:
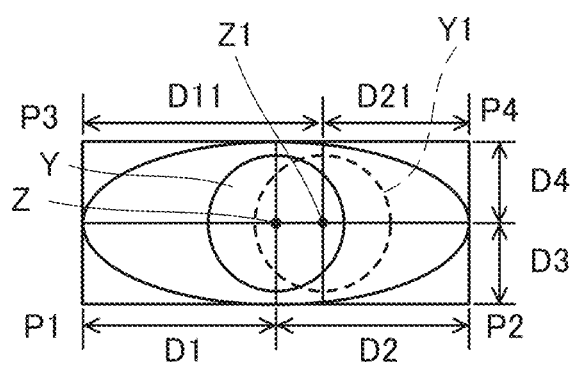
FIG. 3E is a view showing an example of the iris centricity calculation showing the deviation of a determined central coordinate of the iris from the center of the entire eye.

A description will be given below of the modification to an image where the eye direction is aligned with the camera. As an example, the following description is given on the assumption that the image of an eye extracted by the face recognizer 22 is the image of an eye shown in FIG. 3E. The face recognizer 22 performs iris central coordinate detection processing for recognizing, from the image portion of an eye extracted by the face recognizer 22, the iris Y1 shown in FIG. 3E by image recognition and determining the central coordinate Z1 of the iris Y1. Then, the determiner 23 performs iris centricity calculation processing for calculating a deviation of the determined central coordinate Z1 of the iris Y1 from the center of the entire eye. The determiner 23 determines the distances D11 and D21 from the left and right sides to the iris center and calculates D11/D21 (horizontal iris centricity). In this case, the calculation result indicates neither the value "1" nor its approximate value. Therefore, the determiner 23 determines that the face image is not a camera-eye-aligned image. The image modifier 24 moves the image of the iris Y1 to match the central coordinate Z1 of the iris Y1 extracted by the face recognizer 22 and shown by the broken line in FIG. 3E with the central coordinate Z of the iris Y shown in FIG. 3C and modifies a portion of the iris Y1 not overlapping with the iris Y to an image of the white.

The controller 21 allows the storage device 15 to store a modified shot image G11 modified from the shot image G1 by the image modifier 24. For example, the controller 21 associates the modified shot image G11 with the original shot image G1 and then allows the storage device 15 to store the modified shot image G11 as a separate piece of data. The controller 21 may overwrite the original shot image G1 with the modified shot image G11 and allow the storage device 15 to store the overwritten shot image.

Figure 4:
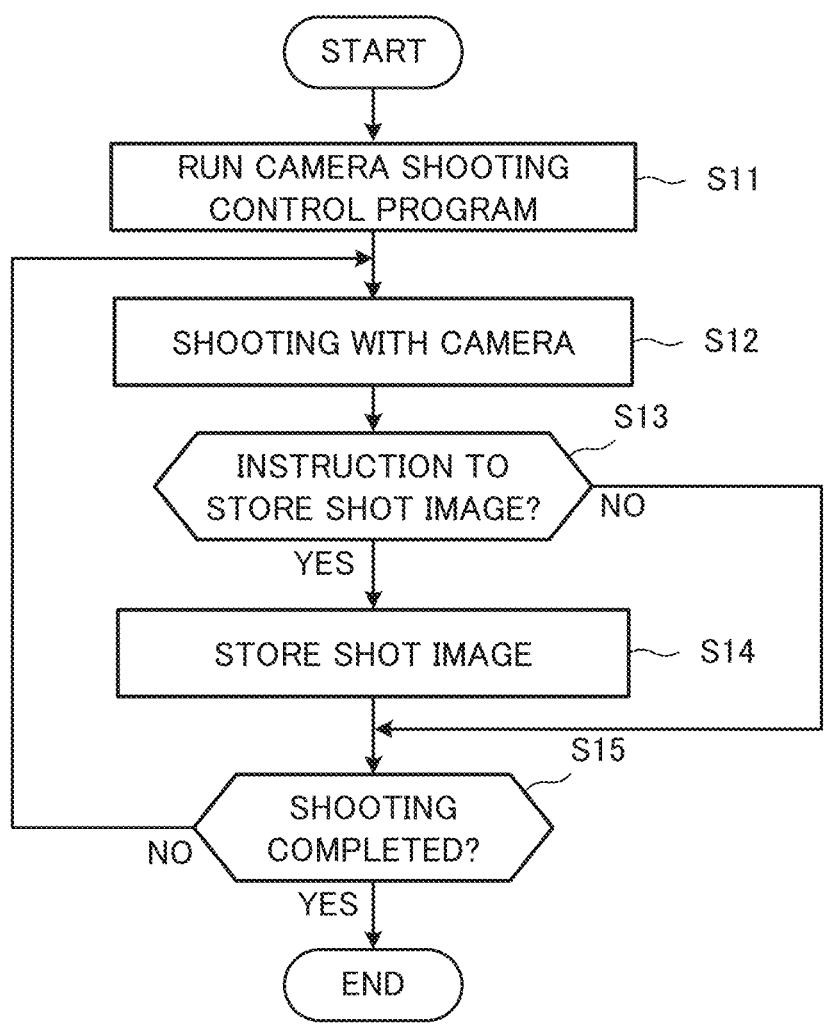
FIG. 4 is a flowchart showing an example of camera shooting processing of the mobile terminal device according to the first embodiment.

Next, a description will be given of camera shooting processing of the mobile terminal device 10 according to the first embodiment with reference to FIG. 4. FIG. 4 is a flowchart showing an example of camera shooting processing of the mobile terminal device according to the first embodiment.

First, when on the mobile terminal device 10 a user makes a touch gesture on the icon 120 corresponding to the camera function on the display device 12 shown in FIG. 1, this gesture is detected by the touch function of the touch panel 13 and the controller 21 runs the camera shooting control program based on a detection signal from the touch panel 13 (S11). The following description is given on the assumption that, between the inside camera 17 and the outside camera 18, the inside camera 17 has been selected by a user's selecting operation.

After the processing step in S11, the controller 21 activates the inside camera 17 and controls selfie shooting with the inside camera 17 according to a user's shutter operation (S12). In other words, selfie shooting with camera is performed. For example, suppose that, as a result of the shooting with camera at this time, a selfie shot image G1 shown in FIG. 6B to be described hereinafter has been acquired. The shot image G1 shown in FIG. 6B contains five persons including a picture-taker as subjects.

After the selfie shooting has been performed (S12), the controller 21 determines the presence or absence of a user's instruction to store the selfie shot image G1 (S13). In the presence of a user's instruction to store the shot image G1 ("YES" in S13), the controller 21 allows the storage device 15 to store the shot image G1 (S14). Immediately after the selfie shooting with camera, the controller 21 may allow the storage device 15 to store the selfie shot image G1.

Then, after the processing step in S14 or in the absence of a user's instruction to store the shot image G1 ("NO" in S13), the controller 21 determines the presence or absence of a user's instruction to terminate shooting with camera (S15). In the absence of a user's instruction to terminate shooting with camera ("NO" in S15), the controller 21 goes back to S12 and allows the continuation of shooting with camera. On the other hand, in the presence of a user's instruction to terminate shooting with camera ("YES" in S15), the controller 21 ends this processing.

Figure 5:
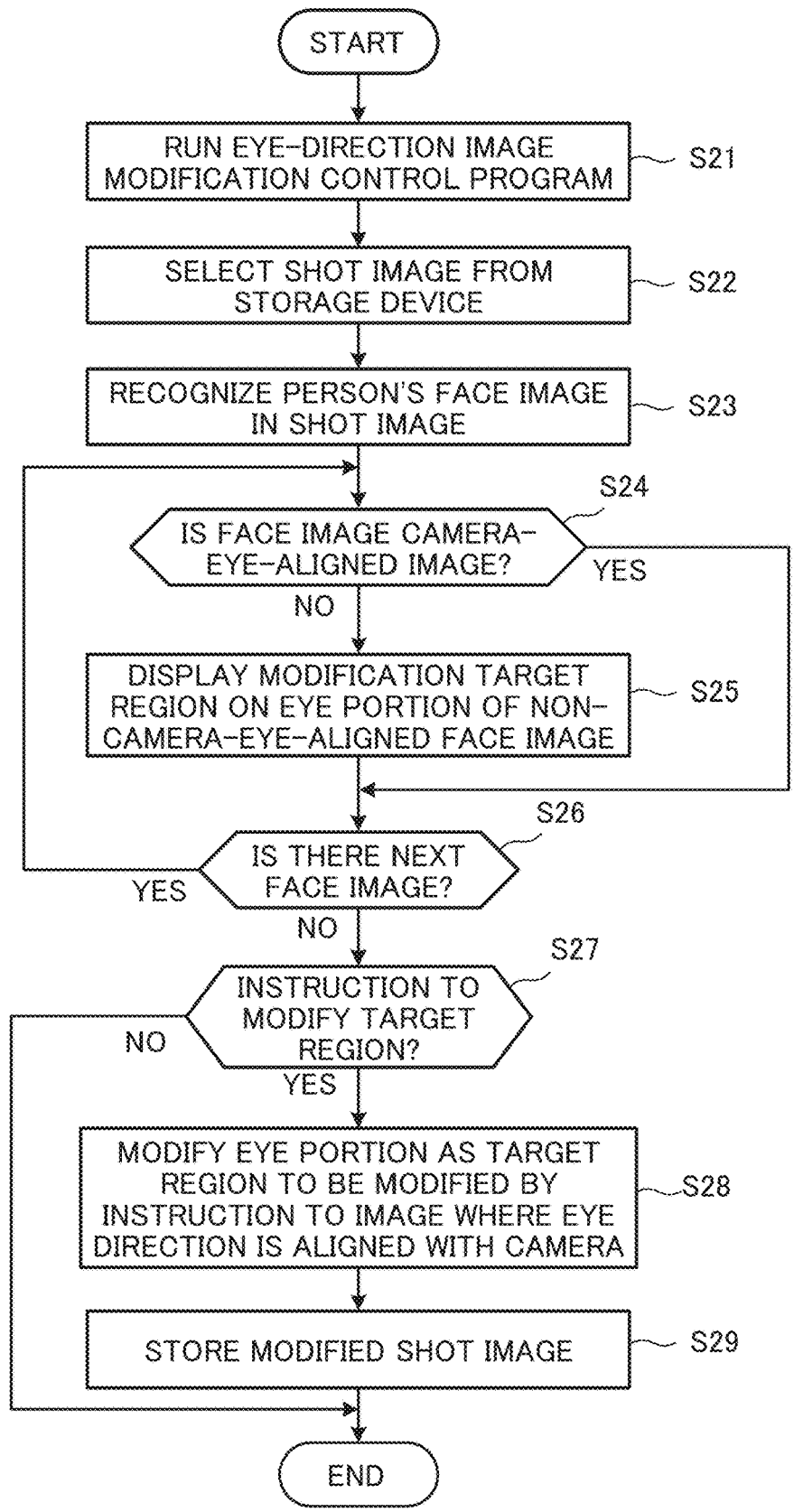
FIG. 5 is a flowchart showing an example of eye-direction image processing of the mobile terminal device according to the first embodiment.

Next, a description will be given of eye-direction image processing of the mobile terminal device 10 according to the first embodiment with reference to FIG. 5. FIG. 5 is a flowchart showing an example of eye-direction image processing of the mobile terminal device according to the first embodiment.

Next, when on the mobile terminal device 10 the user makes a touch gesture on the icon 121 corresponding to the camera-eye-misaligned image modification function on the display device 12 shown in FIG. 1, this gesture is detected by the touch function of the touch panel 13 and the controller 21 runs the eye-direction image modification control program based on a detection signal from the touch panel 13 (S21).

Figure 6A:
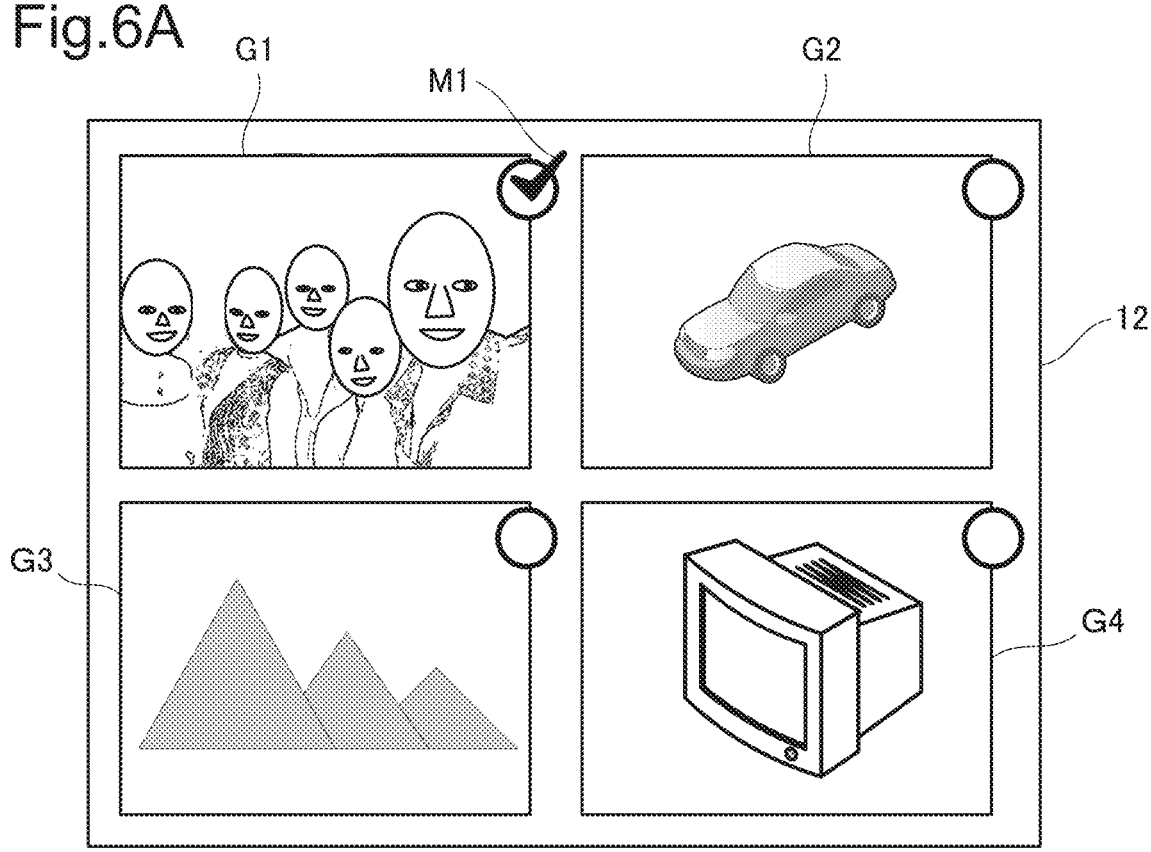
FIG. 6A is a view showing an example of a thumbnail index of a plurality of shot images taken by cameras of the mobile terminal device and stored in the storage device thereof.

The controller 21 allows the display device 12 to display on the screen a thumbnail index of a plurality of shot images G1 to G4 as shown in FIG. 6A. FIG. 6A is a view showing an example of a thumbnail index of a plurality of shot images taken by the cameras of the mobile terminal device and stored in the storage device thereof.

Alternatively, when the user makes a touch gesture on an unshown thumbnail index button displayed on the screen of the display device 12, the controller 21 may allow the display device 12 to display on the screen the thumbnail index shown in FIG. 6A.

Then, when the user makes a touch gesture on a thumbnail shot image G1 shown in the upper left portion of FIG. 6A, this gesture is detected by the touch function of the touch panel 13 and the controller 21 accepts, based on a detection signal from the touch panel 13, the selection of the thumbnail shot image G1 shown in the upper left portion of FIG. 6A (S22) and allows the display device 12 to display a check mark M1 at the upper right of the thumbnail shot image G1 shown in the upper left portion of FIG. 6A.

Figure 6B:
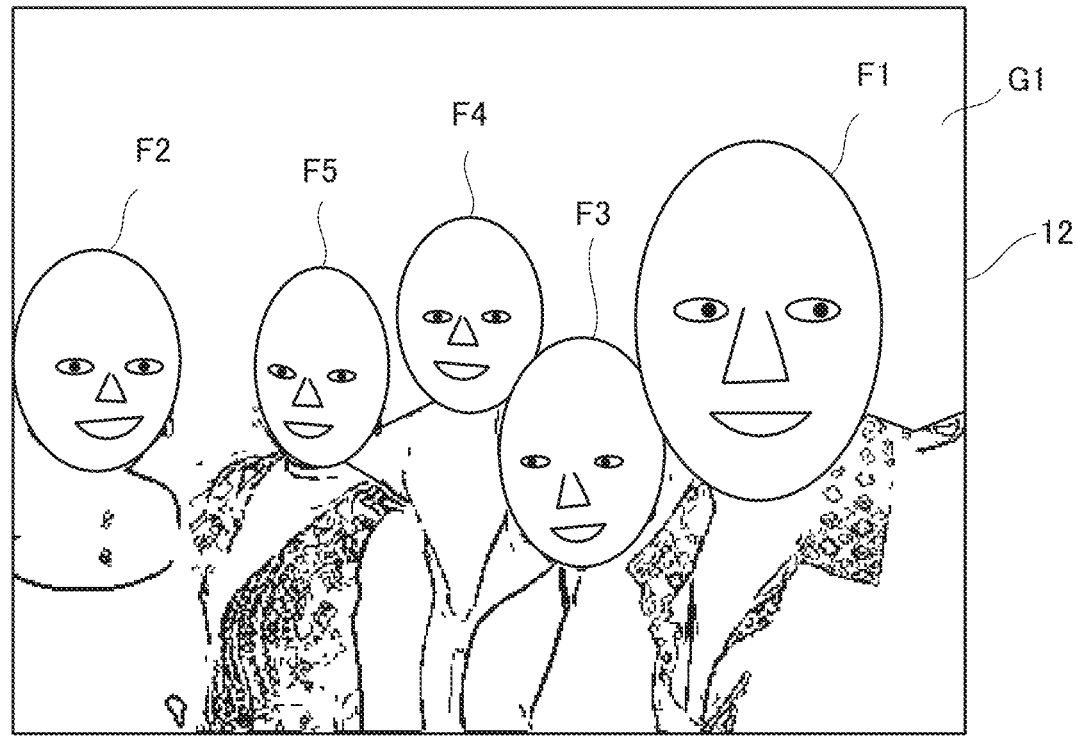
FIG. 6B is a view showing an example of a selfie image.

The controller 21 reads, among the plurality of shot images G1 to G4 stored in the storage device 15, the shot image G1 shown as a thumbnail in the upper left portion of FIG. 6A and selected in S22 from the storage device 15 and allows the display device 12 to display the read shot image G1 as shown in FIG. 6B. FIG. 6B is a view showing an example of a selfie image.

The face recognizer 22 recognizes every person's face image contained in the shot image G1 shown in FIG. 6B (S23). Specifically, the face recognizer 22 detects every facial region in the shot image G1, normalizes the position and size of the facial region, and determines the positions of eyes, a nose, mouth ends, and so on as facial feature points. In doing so, because the shot image G1 shown in FIG. 6B contains five persons' faces, a facial region is detected on a face-by-face basis and determine facial feature points on a face-by-face basis. The face recognizer 22 specifies the respective sizes of the face images F1 to F5 of the five persons by the detection of the facial regions. For example, the respective sizes of the face images F1 to F5 can be specified by specifying the respective numbers of pixels of the facial regions. Suppose that, in the shot image G1 shown in FIG. 6B, the face recognizer 22 has specified (face image F1)>(face image F2)>(face image F3)>(face image F4)>(face image F5).

The determiner 23 determines whether or not each face image recognized by the face recognizer 22 is a camera-eye-aligned image (S24). Specifically, the determiner 23 determines whether or not each of the face images of the five persons recognized by the face recognizer 22 is a camera-eye-aligned image, in the predetermined order, i.e., in descending order of the sizes of the facial regions recognized by the face recognizer 22. More specifically, the determiner 23 first determines whether or not the face image having the largest facial region recognized by the face recognizer 22 is a camera-eye-aligned image (S24).

Figure 7A:
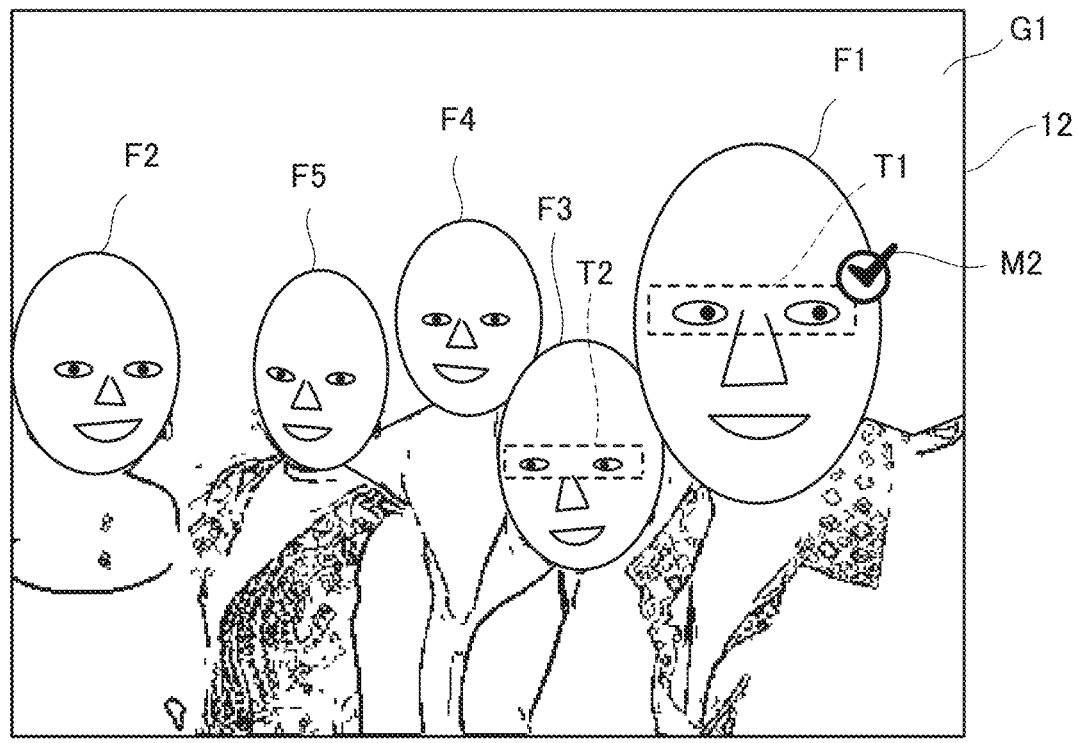
FIG. 7A is a view showing that some persons' face images contained in the selfie image have camera-eye misalignments.

When the determiner 23 determines that the face image having the largest facial region is not a camera-eye-aligned image ("NO" in S24), i.e., when the face image having the largest facial region is determined to have a camera-eye misalignment, the display controller 25 allows, in the shot image G1 displayed on the display device 12, an eye portion of the face image F1 having the largest facial region to be displayed in a representation indicating that the eye portion is a modification target regions T1 as shown in FIG. 7A (S25).

FIG. 7A is a view showing that some persons' face images contained the selfie image G1 have camera-eye misalignments. Because the face image F1 of the rightmost person shown in FIG. 7A has the largest facial region and has a camera-eye misalignment, the display controller 25 allows the eye portion of the largest face image F1 to be displayed in a representation indicating that the eye portion is a modification target region T1.

After the processing step in S25, the controller 21 determines the presence or absence of a next face image (S26). In this case, because there is a face image F2 having the second largest facial region ("YES" in S26), the controller 21 goes back to S24. The determiner 23 determines that the second largest face image F2 is a camera-eye-aligned image ("YES" in S24), and the controller 21 proceeds to S26.

Because there is a face image F3 having the third largest facial region ("YES" in S26), the controller 21 goes back to S24. The determiner 23 determines that the third largest face image F2 is not a camera-eye-aligned image ("NO" in S24). Then, the display controller 25 allows the eye portion of the third largest face image F3 in the shot image G1 displayed on the display device 12 to be displayed in a representation indicating that the eye portion is a modification target region T2 as shown in FIG. 7A (S25).

After the processing step in S25, because there is a face image F4 having the fourth largest facial region ("YES" in S26), the controller 21 goes back to S24. The determiner 23 determines that the fourth largest face image F4 is a camera-eye-aligned image ("YES" in S24), and the controller 21 proceeds to S26. Because there is a face image F5 having the fifth largest facial region ("YES" in S26), the controller 21 goes back to S24. The determiner 23 determines that the fifth largest face image F2 is a camera-eye-aligned image ("YES" in S24). Because there is no next face image ("NO" in S26), the controller 21 proceeds to S27.

Then, after the processing step in S26, the controller 21 determines the presence or absence of an instruction to modify any camera-eye misalignment (S27). The following description is given on the assumption that the user has made a touch gesture on the modification target region T1 of the face image F1 in the shot image G1 shown in FIG. 7A. This gesture is detected by the touch function of the touch panel 13 and, thus, the controller 21 accepts an instruction to modify the modification target region T1 based on a detection signal from the touch panel 13 ("YES" in S27) and allows the display device 12 to display a check mark M2 at the upper right of the modification target region T1 shown in FIG. 7A. Furthermore, suppose that the user has not made a touch gesture on the modification target region T2 of the face image F3 in the shot image G1 shown in FIG. 7A.

Figure 7B:
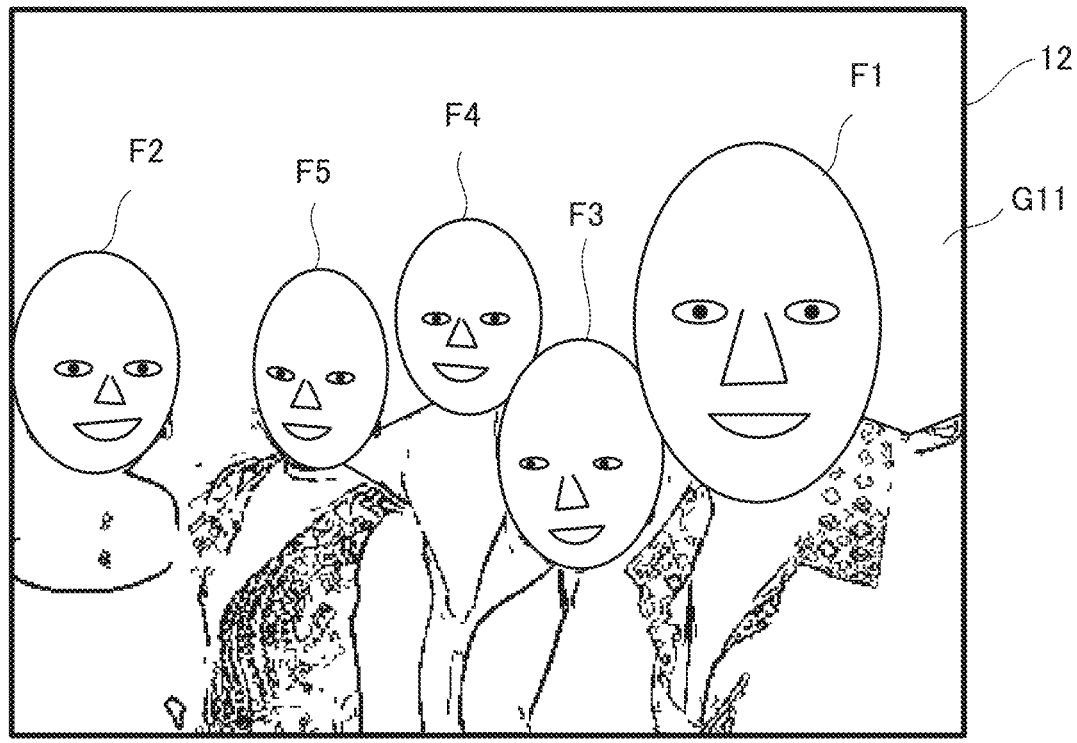
FIG. 7B is a view showing an example of a shot image where, of the face images having camera-eye misalignments shown in FIG. 7A, a face image having a camera-eye misalignment requested to be modified by instruction has been modified to align the eye direction with the camera.

Since there is an instruction to modify the modification target region T1 in the shot image G1 displayed on the display device 12 ("YES" in S27), the image modifier 24 modifies the image of the eye portion, which is the modification target region T1, to an image where the eye direction is aligned with the camera as shown in FIG. 7B (S28). FIG. 7B is a view showing an example of a shot image where, of the face images having camera-eye misalignments shown in FIG. 7A, a face image having a camera-eye misalignment requested to be modified by instruction has been modified to align the eye direction with the camera. Furthermore, since there is no instruction to modify the modification target region T2 in the shot image G1 displayed on the display device 12, the image modifier 24 does not modify the image of the eye portion which is the modification target region T2, as shown in FIG. 7B (S28).

The controller 21 associates the modified shot image G1 shown in FIG. 7B with the original shot image G1 and then allows the storage device 15 to store the modified shot image G1 as a separate piece of data (S29).

After the processing step in S29 or in the absence of an instruction to modify any modification target region in the shot image G1 ("NO" in S27), the controller 21 ends this processing.

As thus far described, in the first embodiment, the storage device 15 stores a shot image G1 taken by the inside camera 17. The face recognizer 22 recognizes every person's face image contained in the shot image G1 selected from among shot images G1 to G4 stored in the storage device 15. The determiner 23 determines whether or not each person's face image recognized by the face recognizer 22 is a camera-eye-aligned image. The image modifier 24 modifies the image of an eye portion in a face image determined not to be a camera-eye-aligned image by the determiner 23 to an image where the eye direction is aligned with the camera. The controller 21 allows the storage device 15 to store a modified shot image G11 modified from the shot image G1 by the image modifier 24. Thus, a camera-eye misalignment of any person in the shot image G1 can be modified. Furthermore, because the user need not determine the presence or absence of a camera-eye misalignment of each person in the shot image G1, the user's work burden can be reduced.

In the picture taking device described in BACKGROUND, a shrinking and moving display of a live view image is performed during shooting with camera in order to put the persons' eyes to the camera. However, if the person's eye direction has not been matched with the camera at the time of shooting with camera, a camera-eye misalignment of the person in the shot image cannot be modified.

Unlike the above, in this embodiment, a camera-eye misalignment of any person in a shot image can be modified.

Furthermore, since the display controller 25 allows, in the shot image G1 displayed on the display device 12, eye portions of face images determined not to be camera-eye-aligned images by the determiner 23 to be displayed in representations indicating that the eye portions are modification target regions T1, T2, the user can know which of the persons in the shot image G1 has a camera-eye misalignment. Then, in the presence of an instruction to modify a modification target region T1 in the shot image G1 displayed on the display device 12, the image modifier 24 modifies the image of the eye portion, which is the modification target region T1, to an image where the eye direction is aligned with the camera. In the absence of an instruction to modify a modification target region T2 in the shot image G1 displayed on the display device 12, the image modifier 24 does not modify the image of the eye portion which is the modification target region T2. Thus, even if some persons in the shot image G1 have camera-eye misalignments, all the camera-eye misalignments are not modified without exception and it is possible to modify only the camera-eye misalignments desired to be modified by the user and avoid modifying the camera-eye misalignments not desired to be modified by the user. Therefore, the degree of freedom for modification can be increased.

Figure 8:
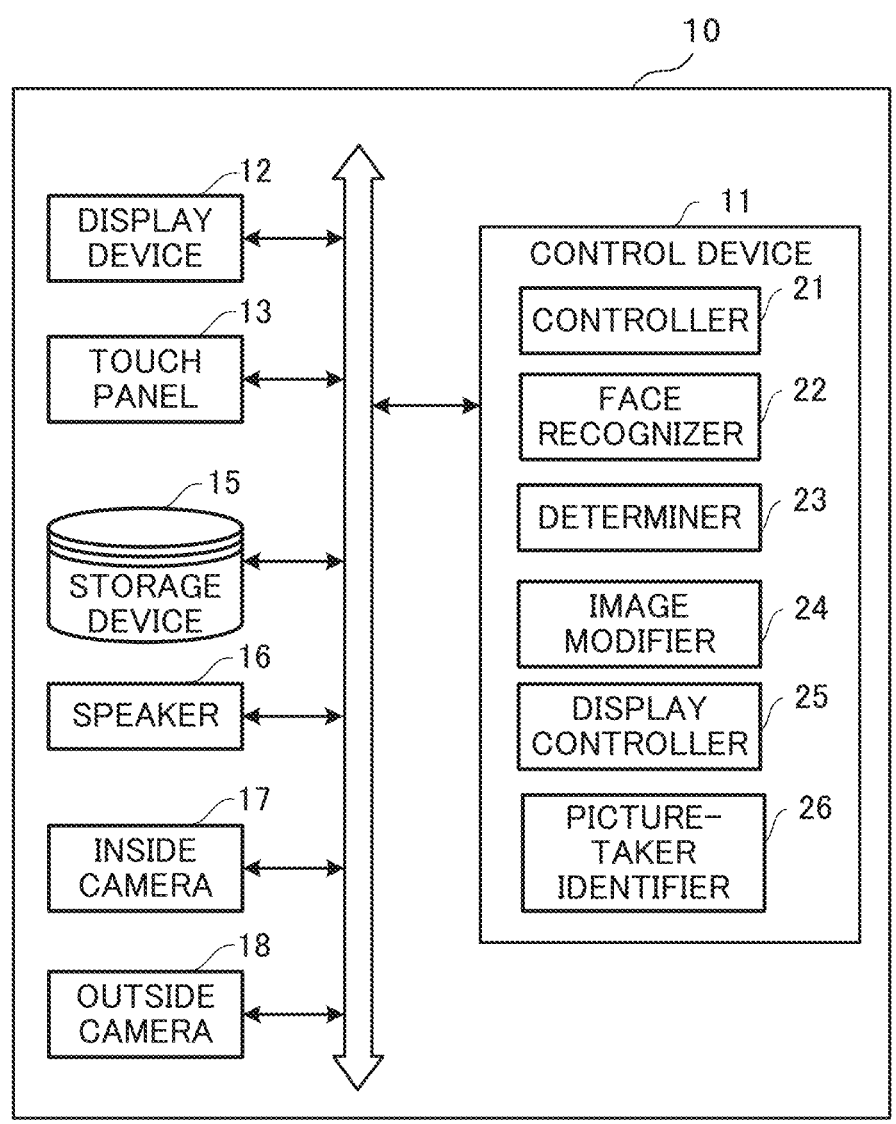
FIG. 8 is a block diagram showing an internal configuration of a mobile terminal device according to a second embodiment of the present disclosure.

Next, a description will be given of a mobile terminal device 10 according to a second embodiment with reference to FIG. 8. FIG. 8 is a block diagram showing an internal configuration of the mobile terminal device according to the second embodiment.

The mobile terminal device 10 according to the second embodiment further includes a picture-taker identifier 26 in addition to the components of the mobile terminal device 10 according to the first embodiment as shown in FIG. 8, and is different from that according to the first embodiment in that when a modification target region T1 for a picture-taker identified by the picture-taker identifier 26 is displayed, the image modifier 24 modifies the image of an eye portion, which is the modification target region T1 for the picture-taker, to an image where the eye direction is aligned with the camera.

When the above-described control program is executed by the above-described processor, the control device 11 further functions as the picture-taker identifier 26. Alternatively, the picture-taker identifier 26 of the control device 11 may not be implemented by the operation of the processor in accordance with the above control program, but may be constituted by a hardware circuit.

The picture-taker identifier 26 identifies, among the persons contained in the selected shot image G1, a picture-taker having taken the shot image G1. Specifically, if the number of face images in the selected shot image G1 recognized by the face recognizer 22 is one, the picture-taker identifier 26 identifies a person having the face image as a picture-taker. If the number of face images in the selected shot image G1 recognized by the face recognizer 22 is plural, the picture-taker identifier 26 identifies as a picture-taker a person who has a face image located at an end side of the shot image G1 and having the largest facial region in the plurality of face images.

Furthermore, when the picture-taker identifier 26 fails to identify a picture-taker in the selected shot image G1 containing a plurality of persons' face images recognized by the face recognizer 22, the picture-taker identifier 26 identifies as a picture-taker a person specified in the selected shot image G1 according to a user's specification operation on the touch panel 13.

When, in the shot image G1 displayed on the display device 12, a modification target region T1 for the picture-taker identified by the picture-taker identifier 26 is displayed, the image modifier 24 modifies the image of an eye portion of the picture-taker, which is the modification target region T1 for the picture-taker, to an image where the eye direction is aligned with the camera. In the presence of an instruction to modify a modification target region for any person other than the picture-taker, the image modifier 26 also modifies the image of an eye portion of the person other than the picture-taker, which is a modification target region T2 for the person.

Figure 9:
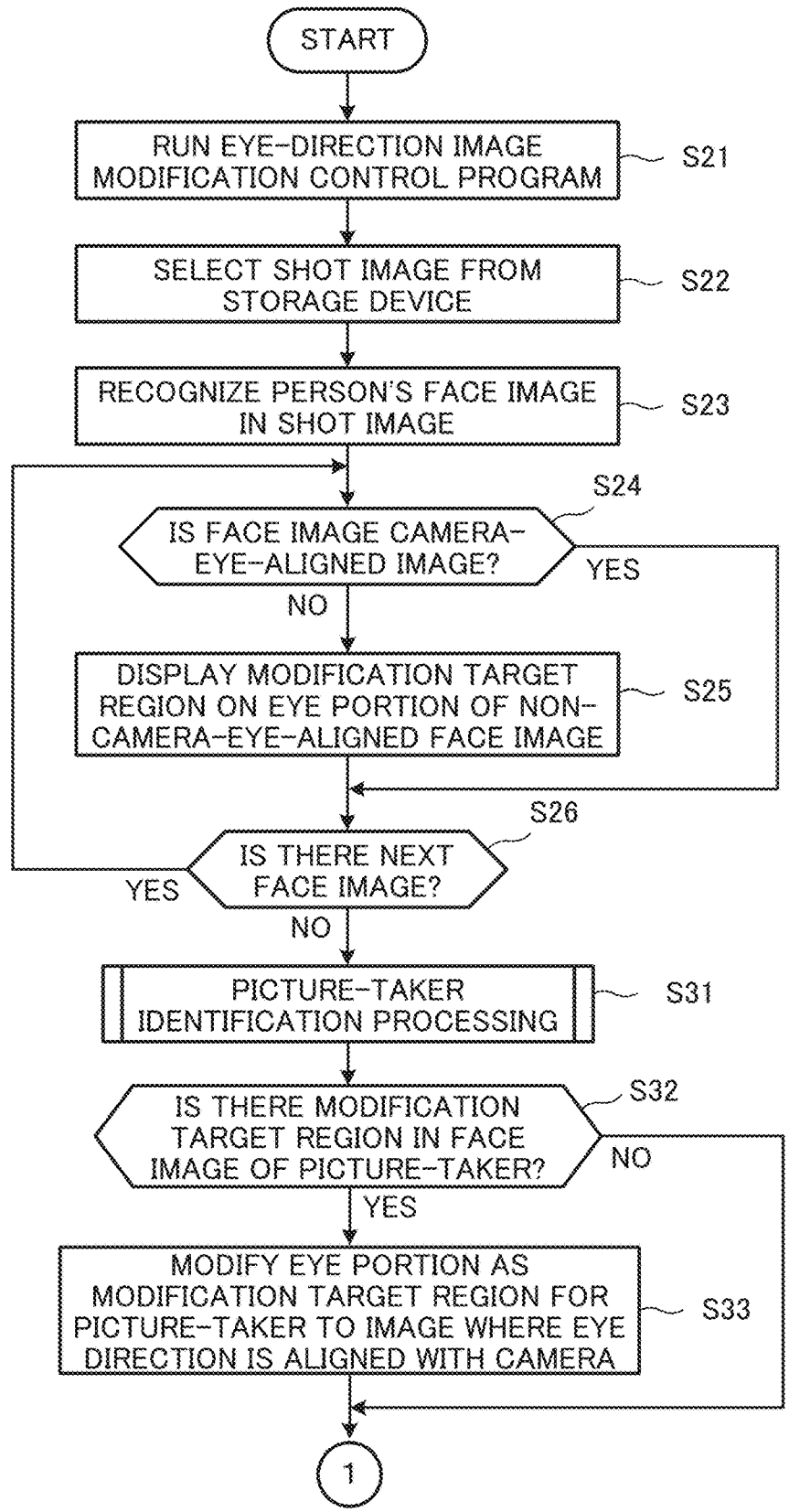
FIG. 9 is a flowchart showing an example of eye-direction image processing of the mobile terminal device according to the second embodiment.
Figure 10:
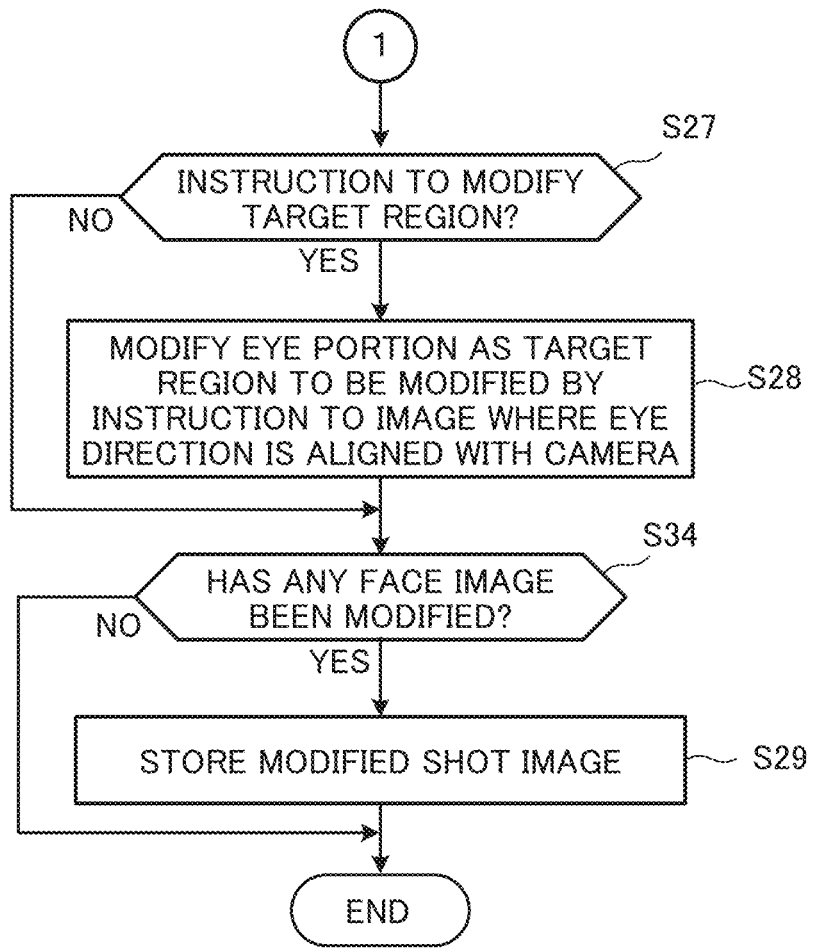
FIG. 10 is a flowchart showing subsequent stages of the eye-direction image processing shown in FIG. 9.

A description will be given below of eye-direction image processing of the mobile terminal device 10 according to the second embodiment with reference to FIGS. 9 and 10. FIG. 9 is a flowchart showing an example of eye-direction image processing of the mobile terminal device according to the second embodiment. FIG. 10 is a flowchart showing subsequent stages of the eye-direction image processing shown in FIG. 9.

Because the steps S21 to S26 shown in FIG. 9 and the steps S27 to S29 shown in FIG. 10 are the same as those in the flowchart shown in FIG. 5 according to the above first embodiment, further explanation of them is omitted and only the steps S31 to S33 shown in FIG. 9 and the step S34 shown in FIG. 10 will be described.

Figure 11:
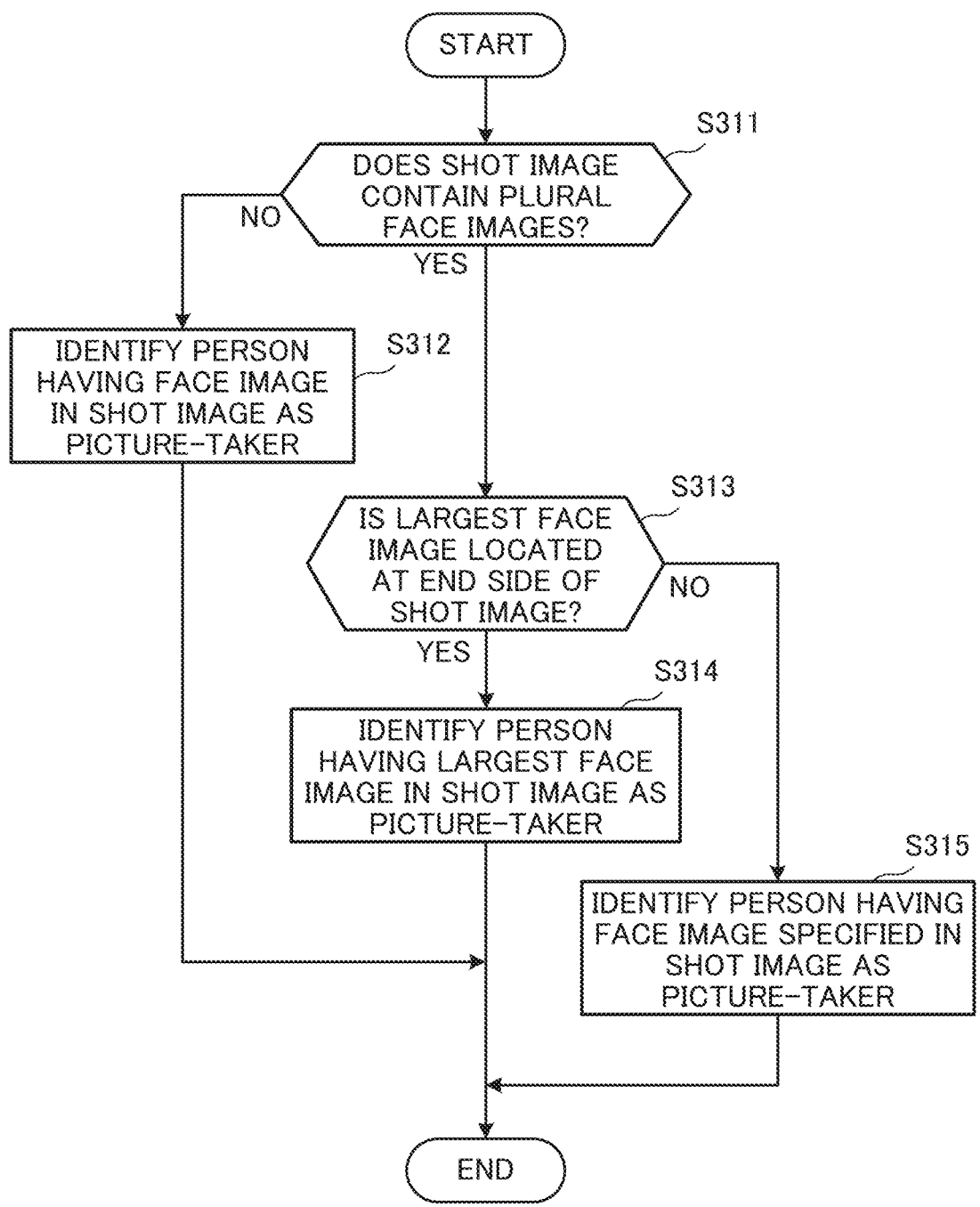
FIG. 11 is a flowchart showing an example of picture-taker identification processing of the mobile terminal device according to the second embodiment.

The picture-taker identifier 26 performs picture-taker identification processing for identifying, among the persons contained in the selected shot image G1, a picture-taker having taken the shot image G1 (S31). First, a description will be given of the picture-taker identification processing with reference to FIG. 11. FIG. 11 is a flowchart showing an example of the picture-taker identification processing of the mobile terminal device according to the second embodiment.

Specifically, the picture-taker identifier 26 determines whether or not the number of persons' face images in the selected shot image G1 recognized by the face recognizer 22 is plural (S311). When the picture-taker identifier 26 determines that the number of persons' face images in the selected shot image G1 recognized by the face recognizer 22 is one ("NO" in S311), the picture-taker identifier 26 identifies the person having the face image as a picture-taker (S312).

On the other hand, when the picture-taker identifier 26 determines that the number of persons' face images in the selected shot image G1 recognized by the face recognizer 22 is plural ("YES" in S311), the picture-taker identifier 26 determines whether or not the largest one of the plurality of face images is located at an end side of the shot image G1 (S313). When the largest face image is located at an end side of the shot image G1 ("YES" in S313), the picture-taker identifier 26 identifies the person having the largest face image in the shot image G1 as a picture-taker (S314).

When the picture-taker identifier 26 determines that the largest face image is not located at any end side of the shot image G1 ("NO" in S313), the picture-taker identifier 26 identifies as a picture-taker a person specified in the selected shot image G1 according to a user's specification operation on the touch panel 13 (S315).

Then, after the processing step in S312, the processing step in S314 or the processing step in S315 each shown in FIG. 11, the controller 21 determines whether or not a modification target region T1 is displayed in the face image of the picture-taker identified by the picture-taker identifier 26 (S32). When the controller 21 determines that a modification target region T1 is displayed in the face image of the picture-taker ("YES" in S32), the image modifier 24 modifies the image of an eye portion of the picture-taker, which is the modification target region T1 for the picture-taker, to an image where the eye direction is aligned with the camera (S33).

After the processing step in S33 or when the controller 21 determines that no modification target region T1 is displayed in the face image of the picture-taker ("NO" in S32), the controller 21 determines the presence or absence of an instruction to modify any camera-eye misalignment (S27). For example, when the user makes a touch gesture on at least one modification target region T2 of the plurality of face images in the shot image G1, this gesture is detected by the touch function of the touch panel 13 and, thus, the controller 21 accepts an instruction to modify the modification target region T2 based on a detection signal from the touch panel 13 ("YES" in S27) and allows the display device 12 to display a check mark at the upper right of the modification target region T2 requested to be modified by the instruction, like the first embodiment described above. Then, the image modifier 24 modifies the image of an eye portion, which is the modification target region T2 requested to be modified by the instruction, to an image where the eye direction is aligned with the camera (S28). After the processing step in S28 or when the controller 21 accepts no instruction to modify any modification target region T2 ("NO" in S27), the controller 21 determines whether or not any of the eye portions of the face images in the original shot image G1 has been modified to an image where the eye direction is aligned with the camera (S34). When the controller 21 determines that any of the eye portions of the face images in the original shot image G1 has been modified to an image where the eye direction is aligned with the camera ("YES" in S34), the controller 21 associates the modified shot image G11 with the original shot image G1 and allows the storage device 15 to store the modified shot image G11 as a separate piece of data (S29). On the other hand, when the controller 21 determines that none of the eye portions of the face images in the original shot image G1 has been modified to an image where the eye direction is aligned with the camera ("NO" in S34), the controller 21 ends this processing.

In the case of a so-called selfie, the picture-taker looks, not at the camera, but at the display where a live view image is displayed, for the purpose of checking how the picture-taker themselves as a subject is seen in a picture. Then, the picture-taker presses a shutter button displayed on the display while viewing it. Therefore, the resultant shot picture is a camera-eye-misaligned picture in which the eyes of the picture-taker as a subject are not directed toward the camera lens and their eye direction is not aligned with the camera.

To cope with this, in the above second embodiment, the picture-taker identifier 26 identifies, among the persons contained in the selected shot image G1, a picture-taker having taken the shot image G1. When, in the shot image G1 displayed on the display device 12, a modification target region T1 for the picture-taker identified by the picture-taker identifier 26 is displayed, the image modifier 24 modifies the image of an eye portion of the picture-taker, which is the modification target region T1 for the picture-taker, to an image where the eye direction is aligned with the camera. Thus, a camera-eye misalignment of the picture-taker in the shot image G1 can be efficiently modified. Furthermore, because the user need not identify the picture-taker in the shot image G1, the user's work burden can be reduced. Moreover, in the presence of an instruction to modify a modification target region T2 as for a face image of any person other than the picture-taker in the shot image G1, the image of an eye portion of the person, which is the modification target region T2 for the person, is modified. Therefore, as for a camera-eye misalignment of any person other than the picture-taker in the shot image G1, the modification of the camera-eye-misaligned image can be made only if desired by the user.

Furthermore, if the number of persons' face images in the selected shot image G1 recognized by the face recognizer 22 is one, the picture-taker identifier 26 identifies a person having the face image as a picture-taker. If the number of persons' face images in the selected shot image G1 recognized by the face recognizer 22 is plural, the picture-taker identifier 26 identifies as a picture-taker a person who has a face image located at an end side of the shot image G1 and having the largest facial region in the plurality of face images. Thus, the picture-taker in the shot image G1 can be suitably identified.

Moreover, when the picture-taker identifier 26 fails to identify a picture-taker in the selected shot image G1 containing a plurality of persons' face images recognized by the face recognizer 22, the picture-taker identifier 26 identifies as a picture-taker a person specified in the selected shot image G1 according to a user's specification operation on the touch panel 13 (operation device). Thus, even if the picture-taker identifier 26 has failed to identify a picture-taker, the person specified in the shot image G1 by the user can be identified as a picture-taker of the shot image G1. Hence, the picture-taker can be certainly identified.

In the above second embodiment, in the case where the shot image G1 contains a plurality of persons' face images, the picture-taker identifier 26 identifies as a picture-taker a person who has a face image located at an end side of the shot image G1 and having the largest facial region in the plurality of face images. However, the method of identifying a picture-taker from the shot image G1 is not limited to the above. For example, in the case where the shot image G1 contains a single or plurality of persons' face images, the picture-taker identifier 26 may identify as a picture-taker a person specified in the selected shot image G1 according to a user's specification operation on the touch panel 13. In this case, a person specified in the shot image G1 by the user can be identified as a picture-taker of the shot image G1.

In the above embodiments, the display controller 25 allows a thumbnail index of a plurality of shot images G1 to G4 shown in FIG. 6A to contain not only the shot image G1 taken by the inside camera 17 but also the shot images G2 to G4 taken by the outside camera 18. However, the manner of display of the thumbnail index is not limited to the above. For example, the display controller 25 may allow the thumbnail index to contain only the shot image G1 taken by the inside camera 17. Specifically, the storage device 15 stores the shot images G1 to G4 together with respective attendant pieces of camera type information. The piece of camera type information is a piece of information indicating by which of the inside camera 17 and the outside camera 18 the shot image has been taken. The display controller 25 reads, among the shot images G1 to G4 stored in the storage device 15, only the shot image G1 the piece of camera type information on which is a "piece of information indicating the inside camera 17", and allows the display device 12 to display the read shot image G1 as a thumbnail index. Thus, only shot images G1 which are highly probably selfie images can be listed and a user of selfie shot images G1 can easily make selections from the list.

In the above second embodiment, in the case where the selected shot image G1 contains a plurality of persons' face images recognized by the face recognizer 22, the picture-taker identifier 26 identifies as a picture-taker a person who has a face image located at an end side of the shot image G1 and having the largest facial region in the plurality of face images. However, the method of how the picture-taker identifier 26 identifies a picture-taker from among the face images is not limited to the above. For example, the picture-taker identifier 26 may identify as a picture-taker a person who has a face image located at an end side of the shot image G1 and has an arm extending toward the end side of the shot image G1. In doing so, for example, the picture-taker identifier 26 may identify a picture-taker by extracting the contour of a person having a face image located at an end side of the shot image G1 and determining whether or not a portion corresponding to an arm in an image defined by the extracted contour extends to the end side of the shot image G1, or may identify a picture-taker by determining whether or not a person having a face image located at an end side of the shot image G1 is a person having an arm extending to the end side of the shot image G1, using pattern matching based on a reference image pattern previously stored in the storage device 15.

Alternatively, the mobile terminal device according to the present disclosure may be a mobile terminal device 10 according to the following variation. In the mobile terminal device 10 according to the variation, when all of a plurality of face images in a shot image G1 displayed on the display device 12 are each displayed in a representation indicating the presence of a modification target region or when, of the plurality of face images in the shot image G1, a number of face images equal to or more than a predetermined ratio are each displayed in a representation indicating the presence of a modification target region, the display controller 25 allows the display device 12 to display a notification indicating that the number of the representations is equal to or more than the predetermined ratio.

FIG. 12 is a flowchart showing an example of eye-direction image processing of the mobile terminal device according to the variation. Specifically, as shown in FIG. 12, after the processing step in S26, if all of a plurality of face images contained in the shot image G1 have camera-eye misalignments or if, of the plurality of face images contained in the shot image G1, face images of a number of persons equal to or more than the predetermined ratio have camera-eye misalignments (for example, the predetermined ratio is "0.6" and the face images of three or more of five persons contained in the shot image G1 have camera-eye misalignments), the display controller 25 may perform processing for allowing the display device 12 to display a notification indicating that the number of camera-eye misalignments is equal to or more than the predetermined ratio (S41). In this case, all or most of the persons in the shot image G1 have camera-eye misalignments and for this reason the picture is highly likely to have been taken without intention to align their eye directions with the camera. Therefore, the user can be notified that the picture is a shot image not required to modify any camera-eye misalignment, so that it can be prevented that such a picture becomes unnatural as a result of modification of camera-eye misalignments.

The structures, configurations, and processing described in the above embodiments with reference to FIGS. 1 to 12 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A mobile terminal device comprising:
   a housing;
   a display device disposed on a particular one of a plurality of outside surfaces of the housing;
   a camera disposed at a site of the particular surface of the housing other than the display device:
   an image storage device that stores shot images taken by the camera;
   a control device that includes a processor and functions, through the processor executing a control program, as:
   a face recognizer that recognizes a person's face image contained in a shot image selected from among the shot images stored in the image storage device;
   a determiner that determines whether or not the person's face image recognized by the face recognizer is a camera-eye-aligned image where an eye direction of the person is aligned with the camera;
   an image modifier that modifies an image of an eye portion in the face image determined not to be a camera-eye-aligned image by the determiner to an image where the eye direction is aligned with the camera;
   a controller that allows the image storage device to store the shot image modified by the image modifier; and
   an operation device capable of being operated by a user,
   wherein the control device further functions, through the processor executing the control program, as a display controller that allows the display device to display the shot image selected according to a selecting operation made on the operation device by the user,
   the display controller allows, in the shot image displayed on the display device, an eye portion in the face image determined not to be a camera-eye-aligned image by the determiner to be displayed in a representation indicating that the eye portion is a modification target region, in presence of an instruction to modify the modification target region in the shot image displayed on the display device, the image modifier modifies an image of the eye portion which is the modification target region to an image where the eye direction is aligned with the camera, and in absence of the instruction to modify the modification target region in the shot image displayed on the display device, the image modifier avoids modification of the image of the eye portion which is the modification target region, wherein the control device further functions, through the processor executing the control program, as a picture-taker identifier that identifies, among persons contained in the selected shot image, a picture-taker having taken the shot image, when the modification target region for the picture-taker identified by the picture-taker identifier is displayed in the shot image displayed on the display device, the image modifier modifies an image of an eye portion of the picture-taker, which is the modification target region for the picture-taker, to an image where the eye direction is aligned with the camera, and in presence of an instruction to modify a modification target region for any person other than the picture-taker, the image modifier modifies an image of an eye portion of the person other than the picture-taker, which is the modification target region for the person.

2. The mobile terminal device according to claim 1, wherein when a number of persons' face images in the selected shot image recognized by the face recognizer is one, the picture-taker identifier identifies a person having the face image as a picture-taker, and when the number of persons' face images in the selected shot image recognized by the face recognizer is plural, the picture-taker identifier identifies as a picture-taker a person who has a face image located at an end side of the shot image and having a largest facial region in the plurality of face images or a person who has a face image located at an end side of the shot image and has an arm extending to the end side of the shot image.

3. The mobile terminal device according to claim 2, wherein when the picture-taker identifier fails to identify a picture-taker in the selected shot image containing a plurality of persons' face images recognized by the face recognizer, the picture-taker identifier identifies as a picture-taker a person specified in the selected shot image according to a specification operation made on the operation device by the user.

4. The mobile terminal device according to claim 1, wherein the picture-taker identifier identifies as a picture-taker a person specified in the selected shot image according to a specification operation made on the operation device by the user.

5. The mobile terminal device according to claim 1, wherein, in addition to an inside camera which is the camera, an outside camera is disposed on a surface of the housing opposite to the particular surface, the storage device stores the shot images together with respective attendant pieces of camera type information indicating by which of the inside camera and the outside camera the shot image has been taken, and the display controller reads, among the shot images stored in the storage device, only a shot image the piece of camera type information on which is a piece of information indicating the inside camera, and allows the display device to display the read shot image as a thumbnail index.

6. A mobile terminal device comprising:

a housing;

a display device disposed on a particular one of a plurality of outside surfaces of the housing;

a camera disposed at a site of the particular surface of the housing other than the display device:

an image storage device that stores shot images taken by the camera;

a control device that includes a processor and functions, through the processor executing a control program, as:

a face recognizer that recognizes a person's face image contained in a shot image selected from among the shot images stored in the image storage device;

a determiner that determines whether or not the person's face image recognized by the face recognizer is a camera-eye-aligned image where an eye direction of the person is aligned with the camera;

an image modifier that modifies an image of an eye portion in the face image determined not to be a camera-eye-aligned image by the determiner to an image where the eye direction is aligned with the camera;

a controller that allows the image storage device to store the shot image modified by the image modifier; and an operation device capable of being operated by a user, wherein the control device further functions, through the processor executing the control program, as a display controller that allows the display device to display the shot image selected according to a selecting operation made on the operation device by the user, the display controller allows, in the shot image displayed on the display device, an eye portion in the face image determined not to be a camera-eye-aligned image by the determiner to be displayed in a representation indicating that the eye portion is a modification target region, in presence of an instruction to modify the modification target region in the shot image displayed on the display device, the image modifier modifies an image of the eye portion which is the modification target region to an image where the eye direction is aligned with the camera, and in absence of the instruction to modify the modification target region in the shot image displayed on the display device, the image modifier avoids modification of the image of the eye portion which is the modification target region, wherein when all of a plurality of face images in the shot image displayed on the display device are each displayed in a representation indicating presence of the modification target region or when, of the plurality of face images in the shot image, a number of face images equal to or more than a predetermined ratio are each displayed in the representation indicating presence of the modification target region, the display controller allows the display device to display a notification indicating that a number of the representations is equal to or more than the predetermined ratio.

7. A mobile terminal device comprising:

a housing;

a display device disposed on a particular one of a plurality of outside surfaces of the housing;

a camera disposed at a site of the particular surface of the housing other than the display device:

an image storage device that stores shot images taken by the camera; and a control device that includes a processor and functions, through the processor executing a control program, as:

a face recognizer that recognizes a person's face image contained in a shot image selected from among the shot images stored in the image storage device;

a determiner that determines whether or not the person's face image recognized by the face recognizer is a camera-eye-aligned image where an eye direction of the person is aligned with the camera;

an image modifier that modifies an image of an eye portion in the face image determined not to be a camera-eye-aligned image by the determiner to an image where the eye direction is aligned with the camera; and a controller that allows the image storage device to store the shot image modified by the image modifier, wherein when the shot image contains a plurality of persons' face images recognized by the face recognizer, the determiner defines a descending order of facial regions recognized by the face recognizer as a predetermined order, determines, only as for a predetermined number of face images in the predetermined order, whether or not the individual face image is a camera-eye-aligned image, and avoids determining, as for the remaining face images other than the predetermined number, whether or not the individual face image is a camera-eye-aligned image.

\* \* \* \* \*